(12) United States Patent
Gustavsson

(10) Patent No.: US 10,588,445 B2
(45) Date of Patent: Mar. 17, 2020

(54) METHOD AND OVEN FOR VACUUM COOKING

(71) Applicant: MICVAC AB, Mölndal (SE)

(72) Inventor: Martin Gustavsson, Escaldes-Engordany (AD)

(73) Assignee: MICVAC AB, Mölndal (SE)

( * ) Notice: Subject to any disclaimer, the term of this patent is extended or adjusted under 35 U.S.C. 154(b) by 243 days.

(21) Appl. No.: 15/522,369

(22) PCT Filed: Oct. 27, 2015

(86) PCT No.: PCT/EP2015/074908
§ 371 (c)(1),
(2) Date: Apr. 27, 2017

(87) PCT Pub. No.: WO2016/071163
PCT Pub. Date: May 12, 2016

(65) Prior Publication Data
US 2017/0265673 A1    Sep. 21, 2017

(30) Foreign Application Priority Data

Nov. 4, 2014 (SE) ....................... 1430155
Jan. 26, 2015 (SE) ....................... 1500048

(51) Int. Cl.
*A47J 27/04*    (2006.01)
*B65D 81/34*    (2006.01)
(Continued)

(52) U.S. Cl.
CPC ................. *A47J 27/04* (2013.01); *A23L 5/13* (2016.08); *A23L 5/17* (2016.08); *B65D 77/225* (2013.01); *A23L 3/005* (2013.01)

(58) Field of Classification Search
CPC ... A23L 5/13; A23L 5/17; A23L 3/005; B65D 77/225; A47J 27/04
(Continued)

(56) References Cited

U.S. PATENT DOCUMENTS 3,800,778 A    4/1974 Lohr et al.
6,310,325 B1    10/2001 Colburn
(Continued)

FOREIGN PATENT DOCUMENTS

CN    1701030 A    11/2005
EP    1 975 516 A1    10/2008
(Continued)

OTHER PUBLICATIONS

International Search Report (PCT/ISA/210) dated Jan. 26, 2016, by the European Patent Office as the International Searching Authority for International Application No. PCT/EP2015/074908 (7 pages).
(Continued)

*Primary Examiner* — Quang T Van
(74) *Attorney, Agent, or Firm* — Buchanan Ingersoll & Rooney P.C.

(57) ABSTRACT

A method of cooking food arranged in a sealed package including a one-way valve that opens at an overpressure of 20-200 mbar, including: heating the sealed package in an oven at approximately atmospheric pressure for a first time period; and after the first time period, subjecting the package to a sub-atmospheric pressure such that gas leaves the sealed package through the valve.

14 Claims, 2 Drawing Sheets

(51) Int. Cl.
*H05B 6/80* (2006.01)
*A23L 3/01* (2006.01)
*B65D 51/16* (2006.01)
*A23L 5/10* (2016.01)
*B65D 77/22* (2006.01)
*A23L 3/005* (2006.01)

(58) Field of Classification Search
USPC ....... 219/686, 681, 400, 754, 757, 725, 735,
219/734, 762; 426/107, 113, 118, 134,
426/241, 243; 126/21 A; 99/DIG. 14;
220/367.1, 745
See application file for complete search history.

(56) References Cited

U.S. PATENT DOCUMENTS

| | | | |
|---|---|---|---|
| 6,380,524 B1* | 4/2002 | Keller | B65D 77/225 219/725 |
| 2006/0134289 A1 | 6/2006 | Gustavsson | |
| 2008/0138474 A1* | 6/2008 | Murray | B65D 77/225 426/118 |
| 2008/0156804 A1 | 7/2008 | Bardou et al. | |
| 2011/0186030 A1 | 8/2011 | Turek et al. | |
| 2014/0197162 A1* | 7/2014 | Haamer | B65D 77/225 219/735 |

FOREIGN PATENT DOCUMENTS

| | | |
|---|---|---|
| JP | 2000-139365 A | 5/2000 |
| JP | 2007225204 A | 9/2007 |
| JP | 2009-109027 A | 5/2009 |
| JP | 2014523377 A | 9/2014 |
| WO | WO 95/04445 A1 | 2/1995 |
| WO | WO 00/03605 A1 | 1/2000 |
| WO | WO 01/09003 A1 | 2/2001 |
| WO | WO 2002/087993 A1 | 11/2002 |
| WO | WO 03/076302 A1 | 9/2003 |
| WO | WO 03/078266 A1 | 9/2003 |
| WO | WO 2004/045965 A1 | 6/2004 |
| WO | WO 2004/106190 A1 | 12/2004 |
| WO | WO 2007/091951 A1 | 8/2007 |
| WO | WO 2013/004585 A1 | 1/2013 |
| WO | WO 2013/006049 A1 | 1/2013 |

OTHER PUBLICATIONS

Written Opinion (PCT/ISA/237) dated Jan. 26, 2016, by the European Patent Office as the International Searching Authority for International Application No. PCT/EP2015/074908 (6 pages).
Swedish Office Action dated Jul. 6, 2015 in Swedish Application No. 1430155-0 (8 pages).
Swedish Office Action dated Aug. 28, 2015 in Swedish Application No. 1500048-2 (8 pages).
Swedish Office Action dated Dec. 7, 2016 in Swedish Application No. 1430155-0 (5 pages).
Office Action dated May 24, 2018, by the State Intellectual Property Office of the People's Republic of China in corresponding Chinese Patent Application No. 201580057047.4. (7 pages).
Notice of Reasons for Refusal dated Aug. 20, 2019, by the Japanese Patent Office in corresponding Japanese Patent Application No. 2017-425592, with English Translation (6 pages).
Written Opinion dated Nov. 19, 2019, by the Japanese Patent Office in corresponding Japanese Patent Application No. 2017-425592, with English Translation (4 pages).

* cited by examiner

METHOD AND OVEN FOR VACUUM COOKING

TECHNICAL FIELD OF THE PRESENT INVENTION

The present invention relates to a method of cooking food provided in a sealed package, which is provided with a one-way valve that opens at an overpressure of 20-200 mbar.

BACKGROUND OF THE INVENTION

During cooking, most foodstuffs undergo chemical non-reversible reactions. For example, many foodstuffs release liquids and gases/aromas. Some of these aromas are unpleasant and the release of them to the surrounding air is desired process when cooking.

The purpose of pasteurizing foodstuffs is to extend the shelf life of the product, hence allowing safe and enjoyable consumption of the food many days or weeks after its preparation. Pasteurization is often achieved through a heat treatment of the product and sometimes cooking and pasteurization can be achieved in one step.

After heat treatment, the foodstuff is sensitive to manipulation and there is a risk of recontamination. To cook/pasteurize inside a pack eliminates said risk and ensures a potentially safer route to extended shelf life for the product.

To ensure that the coldest point in the package obtains a temperature of above 65° C., it has been necessary to apply so much heat that the pressure in the package has increased substantially. To avoid that such an increased pressure breaks the seal of the package, a counter-pressure has been applied outside the package. However, applying such a counter-pressure means that the boiling point of water is increased, which in turn results in that the hottest points in the package are no longer protected from overheating by flash cooling at 100° C. This causes the food to suffer organoleptically, i.e. deteriorate through non-desirable chemical irreversible reactions.

Cooking with a one-way valve is known through companies like Valvopack/Nutripack and Micvac. The benefit is that higher core temperature can be reached without the need of applying a counter-pressure and at the same time allow undesired gases/aromas to escape through the valve, hence creating a more natural taste as the process resembles what happens in a pot on the stove or in an open tray in the oven.

SUMMARY OF THE INVENTION

The inventor has performed tests with various valves on the market having opening pressures of 20-150 mbar. For some products in some packages, the valves do not open when the desired core temperature of the food product is reached. Examples of such food products are fish and meat, such as beef, pork and ham. This means that the off-aromas stay within the package.

Vacuum may be formed at the same time as the product is sealed, but in such case, off-aromas stay inside the pack. If no vacuum is formed in the sealing process, the same amount of air remains in the pack after the process if the valve has not opened. Forming a vacuum in the sealing stage are for some products tricky as there is a risk that liquids or product ends up in the seal, thereby reducing the strength of the same. Letting air and steam out through a valve during cooking enables a safer, more convenient way to vacuum pack that also has organoleptic advantages.

If, for example, a sealed food package is heated in an oven such that the gas phase temperature inside the package reaches 72° C., the partial pressure of water vapor is 345 mbar. Adding the expansion of the air inside the package at this temperature, a valve having an opening pressure of 150 mbar should open. It has however been shown that this is not the case for many applications. The reason why the valve fails to open is probably that the material of the package stretches/expands and thereby increases the volume of the package and prevents the internal pressure from reaching the opening threshold. This is especially the case for a rigid package with a flexible sealing, such as a plastic film, or a completely flexible plastic package. The off-aromas and liquids may thus stay inside the package even when the temperature in the oven is 120-130° C. The valve would perhaps open if the temperature in the oven was increased further, but in such case the food product would be over-cooked. Another problem is that most available valves are composed of plastic and cannot tolerate temperatures above 140° C.

According to the present invention, the ambient pressure, e.g. the pressure inside the oven, is instead reduced at the end of the cooking process such that the relative overpressure inside the package increases. Thereby, the valve opens and off aromas are released from the package already at temperatures that are compatible with available plastic valves and at which over-cooking of temperature-sensitive foodstuffs, such as fish or meat, can be avoided.

Hence, according to a first aspect of the present invention a method of cooking food provided in a sealed package, which is provided with a one-way valve that opens at an overpressure of 20-200 mbar is provided. Said method comprises:
a first step in which the sealed package is heated in an oven for a first time period, wherein the pressure in the oven during at least a part of the first step is atmospheric pressure or higher; and after the first period, a second step in which the package is subjected to a sub-atmospheric pressure such that gas leaves the sealed package through the valve.

When the sealed package is subjected to the sub-atmospheric pressure in the second step, the valve opens and the food in the package is flash cooled, which means that the need for subsequent cooling is reduced or eliminated. Further, the flash cooling may prevent over cooking. When the package has been subjected to the sub-atmospheric pressure, the pressure inside the package is so low that the need for subsequent vacuum suction is reduced or eliminated. This may be an important benefit as vacuum suction from a food package may be a difficult step. The "vacuum" inside the packages helps preserving the cooked food.

The package of the second aspect comprises a one-way valve that opens at an overpressure of 20-200 mbar, such as 20-150 mbar. Such one-way valves are for example provided by Valvopack/Nutripack (see e.g. WO0109003) and Micvac (see e.g. WO02087993, WO03076302, WO03078266, WO04106190, WO04045985, WO07091951 and WO13004586).

According to one exemplary embodiment, the sealed package may be a package comprising plastic. For example, the package may be sealed with a plastic film. According to one exemplary embodiment, the package is a plastic tray sealed with a plastic film.

According to one exemplary embodiment, the valve is a re-closable valve. Hence, the valve closes when a sufficient amount of steam has left the package, such that the overpressure inside the package has been lowered. Alternatively, the valve may close if the atmospheric pressure in the ambient atmosphere is increased.

According to one exemplary embodiment, the food in the sealed package comprises fish and/or meat.

According to one exemplary embodiment, the pressure in the oven during the entire first step is atmospheric pressure or higher. Hence, in this embodiment, the package is subject to a pressure being atmospheric pressure or higher during the entire first step or first time period.

According to one exemplary embodiment, the first step comprises a first sub-step in which the pressure in the oven is atmospheric pressure or higher, a second sub-step in which the pressure in the oven is lowered to a pressure below atmospheric pressure, a third sub-step in which the pressure in the oven is increased to atmospheric pressure or higher, and a fourth sub-step in which the pressure is at atmospheric pressure or higher. Hence, according to this exemplary embodiment, the pressure is changed during the first step. A benefit of this embodiment is that air and/or steam is removed from the package during the second sub-step. There will therefore be less thermal insulation above the food in the package and the heating/cooking of the food will be quicker. According to this exemplary embodiment, the package is subjected to a reduced pressure two times, i.e. both during the second sub-step of the first step, and during the second step.

According to one exemplary embodiment, the first sub-step has duration of 5-30 minutes. It is beneficial to allow the package to be heated for some time before the pressure is lowered. One reason for this is that the valve opens easier if it has been heated.

According to one exemplary embodiment, the pressure is lowered to 50-500 mbar during the second sub-step. The mentioned pressure range has proven to be suitable for allowing the air/steam to leave the package.

According to one exemplary embodiment, the second sub-step has duration of 0.5-5 minutes. As the lowering of the pressure in an oven does not occur instantaneously, the second sub-step must last for some time to allow the pressure to be lowered sufficiently. The above-specified range has proven to be sufficient for lowering the pressure to the desired pressure.

According to one exemplary embodiment, the pressure is increased again as soon as the desired lowered pressure has been reached. Hence, it is according to this embodiment not necessary to maintain the pressure at the lowered level for some time.

According to one exemplary embodiment, the third sub-step has duration of 2-60 seconds. 2-60 seconds is a suitable time span in order to reach atmospheric pressure again in the oven.

According to another exemplary embodiment, the third sub-step has duration of 2 seconds to 15 minutes. In case it is desired to provide a pressure in the oven that is higher than atmospheric pressure, up to 15 minutes may be required to reach the desired pressure.

According to one exemplary embodiment, the pressure is increased by insertion of steam into the oven. According to another exemplary embodiment, the pressure is increased by means of a compressor.

According to one exemplary embodiment, the temperature in the oven during the first step is at least 70° C., more preferably 70-130° C., and most preferably 70-120° C.

According to one exemplary embodiment, the temperature in the oven during the first time period is at least 80° C., more preferably 80-130° C., and most preferably 80-120° C.

According to one exemplary embodiment, the first time period is within the range of 10-200 min, more preferably within the range of 20-180 min, and most preferably within the range of 30-150 min.

According to one exemplary embodiment, the heating of the first period may comprise dry heating, moist heating or a combination thereof. Consequently, steam may be applied during at least part of the first period.

The sub-atmospheric pressure during the second step is preferably at least 100 millibar (mbar) below atmospheric pressure, such as at least 200, 300, 400 or 500 mbar below atmospheric pressure. According to one exemplary embodiment, the pressure is never below 500 mbar to comply with some regulations and legislations.

After the first time period, the ambient pressure of the sealed packages may be decreased gradually. This may for example be the case if an oven of the second aspect is used and the gas outlet is coupled directly to a running vacuum pump. For example, the pressure may decrease continuously from atmospheric pressure to a target sub-atmospheric pressure, such as 500 mbar below atmospheric pressure. A benefit of a slower decrease of the pressure is that vigorous boiling in the package may be prevented. A problem of vigorous boiling is that the valve may be contaminated and lose its function. Accordingly, according to one exemplary embodiment, the rate of pressure reduction after the first period never exceeds 500 mbar/min. According to one other exemplary embodiment, it may never exceed 250 mbar/min. According to a yet further exemplary embodiment, it never exceeds 100 mbar/min or even 50 mbar/min. If the sub-atmospheric pressure is provided in the oven, the temperature in the oven when the sub-atmospheric pressure is reached may, according to one exemplary embodiment, be 40-130° C., more preferably 60-130° C., even more preferably 60-120° C. and most preferably 60-90° C.

According to one exemplary embodiment, the gas phase temperature in the sealed package never exceeds 80° C., more preferably 78° C., more preferably 76° C., more preferably 75° C. and most preferably 70° C. Controlling the temperature in the oven being used and the subsequent sub-atmospheric pressure may achieve a desired temperature in the sealed package.

When fish is cooked, a final temperature of the fish meat of about 55-70° C., such as 60-70° C., may be desired. If the temperature of the fish meat exceeds 70° C., it may be overcooked, while the fish meat may be under-cooked if it never reaches 55 or 60° C. For beef or lamb, a final temperature of the meat of about 60-70° C., may be desired.

According to one exemplary embodiment, the sub-atmospheric pressure is 650-850 mbar below atmospheric pressure. To obtain flash cooling at 70° C., a pressure of about 30 kPa (about 700 mbar below atmospheric pressure) is needed. To obtain flash cooling already at 60° C., a pressure of about 20 kPa (about 800 mbar below atmospheric pressure) is needed. Accordingly, when the food in the sealed package comprises fish, beef or lamb it is beneficial to provide a sub-atmospheric pressure of 650-850 mbar below atmospheric pressure, such as 700-800 mbar below atmospheric pressure.

When poultry is cooked, a final temperature of the meat of about 72-82° C. may be desired. If the temperature of the poultry exceeds 82° C., it may be overcooked, while a temperature of at least 72° C. is often required to ensure that *listeria* and *salmonella* bacteria are killed. Similar temperatures are desired for pork. To obtain flash cooling at 82° C., a pressure of about 50 kPa (about 500 mbar below atmospheric pressure) is needed. Accordingly, in one exemplary embodiment, the sub-atmospheric pressure is 400-650 mbar below atmospheric pressure, such as 400-500 mbar below atmospheric pressure. According to one exemplary embodiment, the food comprises pork or chicken.

Other types of food, such as lasagna, meatballs, stews, rise-based meals and vegetables can reach a higher temperature, such as 80-90° C., without being overcooked. Sometimes, such temperatures are even required to meet food safety regulations. Accordingly, a sub-atmospheric temperature of 250-600 mbar below atmospheric pressure, such as 250-500 mbar below atmospheric pressure, may be sufficient for such types of food.

According to one exemplary embodiment, the method further comprises the step of subjecting the sealed package to cooling after it has been subjected to the sub-atmospheric pressure of the second step. Hence, according to this exemplary embodiment, the food in the sealed package may thus be cooled in two way; first by flash-cooling caused by the sub-atmospheric pressure and then by the reduction of the ambient temperature during the cooling step.

According to one exemplary embodiment, the ambient temperature of the sealed package may for example be 10° C. or lower, more preferably 8° C. or lower.

According to one exemplary embodiment, the temperature of the food in the package is 10° C. or lower, more preferably 8° C. or lower, after the cooling step.

According to one exemplary embodiment, the temperature of the food in the sealed package has been reduced to 10° C. or lower, such as 8° C. or lower, within two hours of the expiry of the first time period.

According to one exemplary embodiment, the cooling step is carried out at approximately atmospheric pressure.

According to one exemplary embodiment, the cooling step and the foregoing sub-atmospheric step may be carried out in the same device. This means that the temperature in the oven may be decreased after the sub-atmospheric step. As understood from the above, the sealed package may be subjected to atmospheric pressure after it has been subjected to the sub-atmospheric pressure. During this step, which may be the cooling step, the package will become a "vacuum pack"

According to one exemplary embodiment, the sub-atmospheric pressure is provided in the oven by reducing the pressure therein.

According to one exemplary embodiment, the sealed package is removed from the oven and then subjected to the sub-atmospheric pressure in a vacuum chamber that is separate from the oven.

According to one exemplary embodiment, the temperature in the vacuum chamber is decreased, for example to 8° C. or lower, after the sealed package has been subjected to the sub-atmospheric pressure such that the temperature of the food in the sealed package is decreased, for example to 10° C. or lower, such as 8° C. or lower.

According to one exemplary embodiment, the vacuum chamber comprises cooling elements.

A steam oven for cooking at atmospheric and sub-atmospheric pressure, useable for carrying out the method according to any one of the previously described embodiments of the presented invention, is presented. Said oven comprises:
a housing defining a cavity capable of receiving food packages;
at least one heating element;
a steam-generating arrangement for providing steam in the cavity;
an fan arrangement; and
a gas outlet connectable to a vacuum source for withdrawing gas from the cavity, wherein said oven being operable in at least three different modes including: (i) dry heating at atmospheric pressure; (ii) moist heating at atmospheric pressure; and (iii) operation at sub-atmospheric pressure.

The oven may also be operable in a further mode being a mix between (i) and (ii).

The person skilled in the art is familiar with steam ovens capable of operating in (i) and (ii) as well as the mix of (i) and (ii). Such ovens are used today in food-service and restaurant environments. However, the steam ovens used today are not capable of operation at sub-atmospheric pressure. In contrast to the traditional steam ovens, the steam oven of the present invention comprises a gas outlet connectable to a vacuum source for withdrawing gas from the cavity. The pressure in the cavity may thus be reduced.

As mentioned, the oven may be used for carrying out the method of the first aspect. Accordingly, the sealed package may be subjected to the sub-atmospheric pressure in the oven. This means that the method may comprise reducing the pressure in the oven after the first period to the sub-atmospheric pressure.

The dimensions of the oven are preferably about the same as the dimensions of the steam ovens in today's restaurant and food-service environments. Such steam ovens has several levels and each level is adapted to receive one food package having a width of about 600 mm and a depth of about 400 mm (i.e. a so called 1/1 gastro package for baking), two food packages having a width of about 300 mm and a depth of about 400 mm (i.e. so called 1/2 gastro packages for baking), four food packages having a width of about 300 mm and a depth of about 200 mm (i.e. so called 1/4 gastro packages for baking) or eight food packages having a width of about 150 mm and a depth of about 200 mm (i.e. so called 1/8 gastro packages for baking). In cooking and preparation of food, the packages usually are somewhat smaller. Hence, the oven may be adapted to receive a package having a width of about 530 mm and a depth of about 325 mm (i.e. a so called 1/1 gastro package), two food packages having a width of about 265 mm and a depth of about 325 mm (i.e. so called 1/2 gastro packages), four food packages having a width of about 265 mm and a depth of about 160 mm (i.e. so called 1/4 gastro packages) or eight food packages having a width of about 130 mm and a depth of about 160 mm (i.e. so called 1/8 gastro packages).

The cavity may be capable of receiving at least one food package having a width of 530 or 600 mm.

The cavity of the steam oven of the present disclosure may be capable of receiving at least one food package having a width of 530 or 600 mm. Hence, according to one exemplary embodiment, the cavity may have a width of 530-750 mm. Further, the cavity of the steam oven of the present disclosure may be capable of receiving at least one food package having a depth of 325 mm. Therefore, according to one exemplary embodiment, the cavity may have a depth of 325-550 mm.

The height of the cavity may be at least 200 mm, more preferably at least 500 mm, even more preferably at least 1300, and most preferably 1800 mm. This means that the steam oven of the present disclosure may have several levels such that several 1/1 gastro packages can be placed one above each other in the oven.

The housing may comprise an opening and a door and wherein the housing is sealed when the door is closed. The housing of the oven of the first aspect preferably comprises an opening and a door capable of closing the opening. In a closed configuration, such a door preferably constitutes at least part of a side wall of the housing. Further, the housing is preferably sealed in the closed configuration such that a sub-atmospheric pressure may be maintained inside the cavity.

The oven may further comprise a vacuum tank connected to the gas outlet. Such a vacuum tank may be an integral part of the oven or a separate tank.

The oven may comprise a vacuum pump connected to the gas outlet.

The oven may comprises a vacuum pump connected to the vacuum tank. The vacuum source may for example be a vacuum pump, a vacuum tank or a vacuum tank connected to a vacuum pump. If a vacuum tank is used, the pressure in the cavity may be reduced more quickly than if the gas outlet is connected directly to the vacuum pump.

The steam generating arrangement may comprises a water inlet connectable to a water source. For example, the steam generating arrangement may comprises a boiler. Alternatively, the steam generating arrangement may utilize the at least one heating element to generate the steam.

The gas cleaning arrangement may be connected to the gas outlet to prevent contamination of equipment arranged downstream of the gas outlet, such as the vacuum tank and/or the vacuum pump and associated hoses and couplings. The gas cleaning arrangement may for example comprise a condenser for condensing fatty acids, aromatic compounds and/or water vapor in the withdrawn gas. The gas cleaning arrangement may also comprise a filter that may be removable and cleanable.

The oven may be provided with seals such that a pressure of at least 200 mbar below atmospheric pressure may be maintained in the cavity. Operation of pressurized equipment requires by law to be safe for the operators. An arrangement with sub-ambient pressure is beneficial since it upon failure implodes in contrast to over pressurized equipment that might "explode" and cause injuries to the operator. However, specific legislation exists for devices operating at pressure lower than 500 mbar below atmospheric pressure. 500 mbar below atmospheric pressure may be enough, but the oven of the first aspect may also be adapted for even lower pressures, such as 800 mbar below atmospheric pressure or even 950 mbar below atmospheric pressure. But 500 mbar sub atmosphere makes homologation work towards protection of operator much easier.

The oven may comprise an air inlet comprising a valve, by means of which air can be let into the cavity to increase the pressure to atmospheric pressure.

The oven may be programmable such that the variation of temperature, humidity and pressure in the cavity over time can be set. The oven may thus comprise a control unit that is connected to a valve provided in connection with the gas outlet, the fan arrangement, the at least one heating element and the steam generation arrangement. If the oven of the first aspect comprises the air inlet, the control unit may also be connected to the valve of the air inlet. Via the connections, the control unit may submit control signals.

BRIEF DESCRIPTION OF THE DRAWINGS

The above, as well as additional, objects, features and advantages of the present invention will be better understood through the following illustrative and non-limiting detailed description of exemplary embodiments of the present invention, with reference to the appended drawings, wherein.

DETAILED DESCRIPTION OF EXEMPLARY EMBODIMENTS

Figure 1:
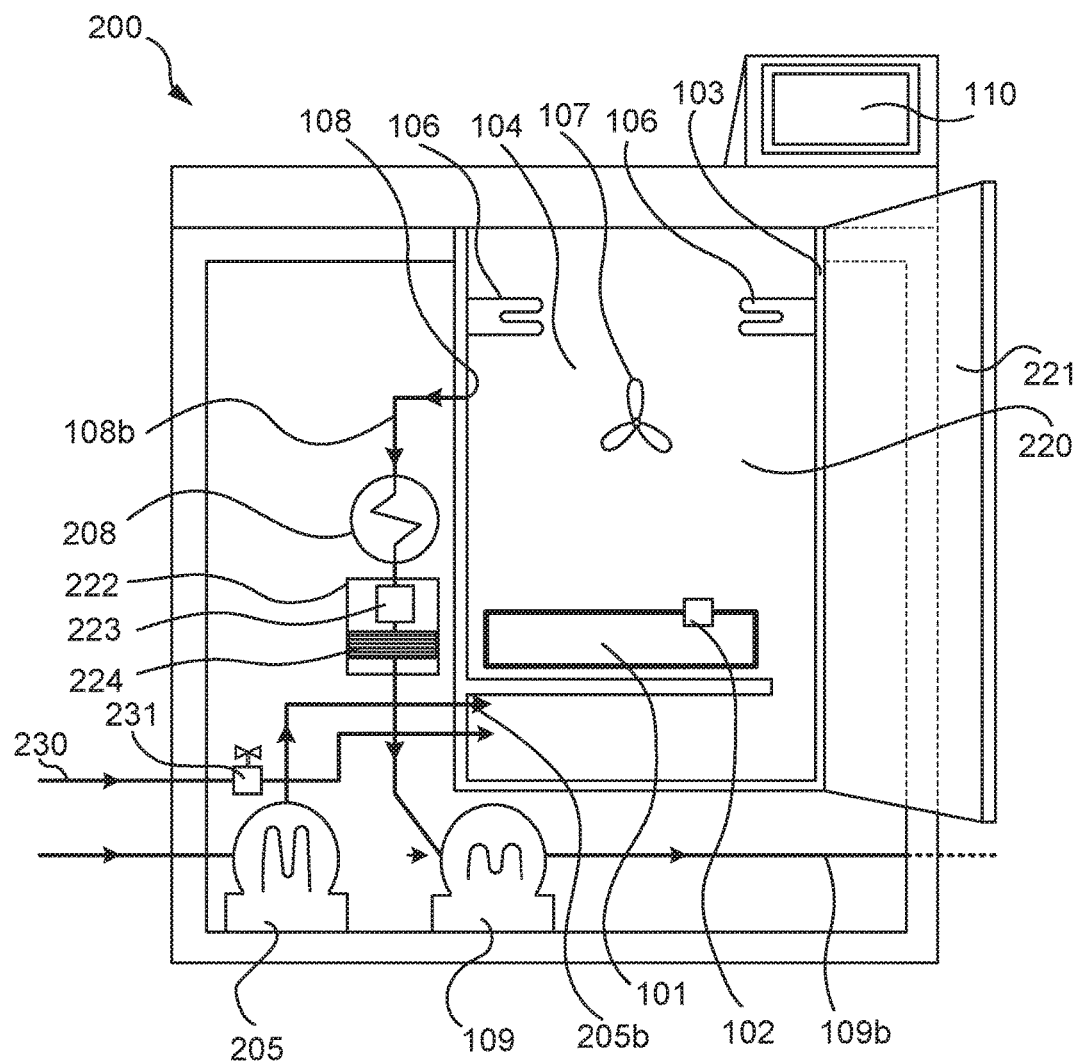
FIG. 1 schematically illustrates an oven according to the present invention.
Figure 2:
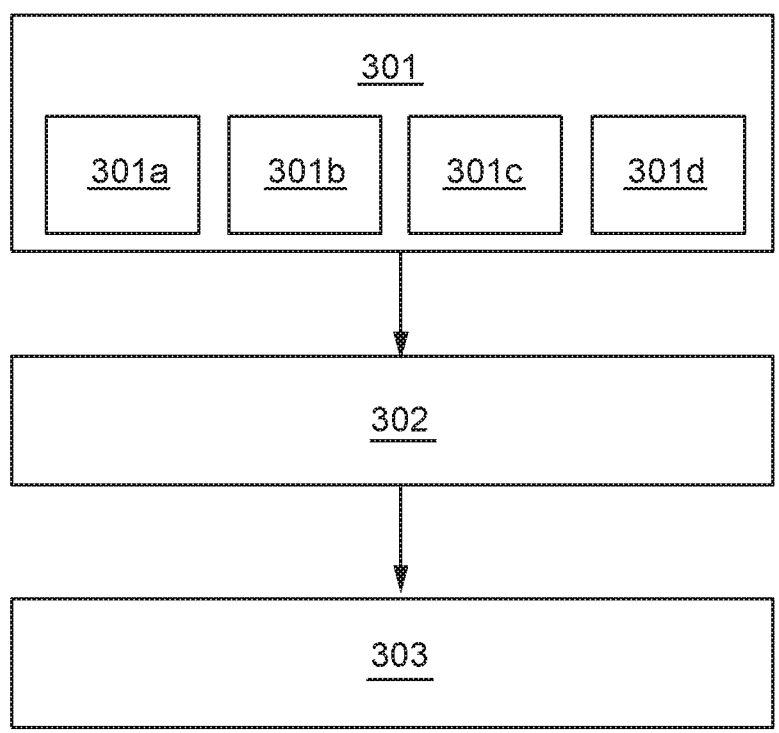
FIG. 2 illustrates a flow chart of a method according to the present invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout the description.

In the following description, the present invention is described with reference to a food container having a plastic lower portion covered with a plastic film on which a valve is arranged. It is however to be understood that any package able to contain food may be used, such as a plastic bag. The materials of the food package are also exchangeable as long as the characteristics and behaviour is maintained as described.

FIG. 1 shows a non-limiting embodiment of a vacuum oven 200. The vacuum oven 200 is suitable for cooking of food arranged in a sealed package 101 comprising a one-way valve 102 that opens at a pressure, which is normally a pressure of 20-200 mbar. For example, the package may be a plastic package sealed with a plastic film. The food in the sealed package may for example comprise fish or meat.

The vacuum oven 200 comprises a housing 103 that defines a cavity 104 capable of receiving the sealed food package 101. The housing 103 is openable, such that objects, e.g. the sealed food package 101, can be placed in the cavity 104 and taken out of it. The housing 103 is designed to maintain, in a closed configuration, a sub-atmospheric pressure, which is often somewhat inaccurately referred to as "vacuum", in the cavity 104. The housing 103 is thus provided with seals to prevent substantial amounts of air from leaking in when the sub-atmospheric pressure is provided in the cavity 104.

The oven is provided such that a pressure of at least 200 mbar below atmospheric pressure may be maintained in the cavity. The oven may also be adapted for maintaining a pressure of 500 mbar below atmospheric pressure, but it may also be adapted for even lower pressures, such as 800 mbar below atmospheric pressure or even 950 mbar below atmospheric pressure.

The vacuum oven 200 further comprises a steam generator 205 for providing steam. The steam generator 205 comprises a water inlet and a boiler. The steam generator 205, which in the present embodiment is arranged outside the housing 104, is connected to a steam inlet 205b in the housing, such that the generated steam may be provided into the cavity.

The vacuum oven further comprises heating elements 106 arranged in the cavity. The purpose of the heating elements 106 is thus not to generate steam, but to provide heat for a cooking step, such as step a) of the method of the present invention. To facilitate the heat transfer during such a cooking step, the vacuum oven 200 further comprises a fan arrangement 107 for circulating gas in the cavity. The fan arrangement 107 may significantly shorten the cooking time. An alternative or complementary way of facilitating heat transfer and thereby shorten the cooking time is to increase the humidity of the air inside the cavity 104 during cooking.

The housing of the oven of the first aspect preferably comprises an opening 220 and a door 221 capable of closing the opening. In a closed configuration, such a door 221 preferably constitutes at least part of a side wall of the housing. Further, the housing is preferably sealed in the closed configuration such that a sub-atmospheric pressure may be maintained inside the cavity.

To provide the sub-atmospheric pressure in the cavity 104, such as in step b) of the method of the present invention, the housing is provided with a gas outlet 108. Further, the vacuum oven 200 comprises a vacuum pump 109 connected to the gas outlet 108 via a vacuum line 108b. A heat exchanger 208 may be arranged on the vacuum line 108b. The other end of the vacuum pump 109 is connected to a drain (not shown) via an outlet line 109b.

A gas cleaning arrangement 222 is also connected to the gas outlet to prevent contamination of equipment arranged downstream of the gas outlet. The gas cleaning arrangement comprises a condenser 223 for condensing fatty acids, aromatic compounds and/or water vapor in the withdrawn gas. The gas cleaning arrangement also comprises a filter 224 that may be removable and cleanable.

The oven 200 also comprises an air inlet 230 comprising a valve 231, by means of which air can be let into the cavity 104 to increase the pressure to atmospheric pressure.

The vacuum oven 200 further comprises an interface 110, such as a screen, e.g. a touch screen, providing information about the operation of vacuum oven 200. The interface 110 may also allow the user to program the operation in the steam oven 200. For example, the user may set a temperature profile and/or a pressure profile for the operation, such that the variation of temperature, humidity and pressure in the cavity over time can be set. Such (a) profile(s) may depend on the type and the thickness of the packaged food. The control unit may therefore be connected to a valve provided in connection with the gas outlet, the fan arrangement, the at least one heating element, the steam generation arrangement and the valve of the air inlet. Via the connections, the control unit may submit control signals.

The dimensions of the oven 200 are preferably about the same as the dimensions of the steam ovens in today's restaurant and food-service environments. Such steam ovens has several levels and each level is adapted to receive one so called 1/1 gastro package, two so called 1/2 gastro packages), four so called 1/4 gastro packages) or eight so called 1/8 gastro packages).

The height of the cavity may be at least 200 mm, such as at least 500 mm, such as at least 1300 or 1800 mm. This means that the steam oven (200) may have several levels such that several 1/1 gastro packages can be placed in the oven.

The oven 200 is operable in at least three different modes including:
(i) dry heating at atmospheric pressure;
(ii) moist heating at atmospheric pressure; and
(iii) operation at sub-atmospheric pressure. The oven may also be operable in a further mode being a mix between (i) and (ii).

The method of cooking the food comprises:
a first step 301 in which the sealed package 101 is heated in the oven 200 at approximately atmospheric pressure for a first time period, or at least a part of the first time period; and after the first period, a second step 302 in which the package 101 is subjected to a sub-atmospheric pressure such that gas leaves the sealed package 101 though the one-way valve 102.

An oven 200 is suitable to use for carrying out the method of cooking the food. When the sealed package 101 has been placed in the oven 200, the heater 106 and fan 107 are activated and the food in the sealed package is heated for a period in the range of 10-200 min. The temperature in the oven during this first time period may be at least 70° C. or, in some embodiment, at least 80° C. The heating during the first period may be either dry heating, moist heating or a combination thereof. Consequently, during this time period, the steam generator 205 may be operated to provide steam during at least a part of the first period. After the first time period, the pressure in the oven 200 may be lowered and the sealed package 101 may be subjected to the sub-atmospheric pressure in the oven 200.

The sub-atmospheric pressure is preferably at least 100 millibar (mbar) below atmospheric pressure, such as at least 200, 300, 400 or 500 mbar below atmospheric pressure. In order to comply with some regulations and legislations, the pressure may in certain situations never be below 500 mbar.

The ambient pressure of the sealed packages may be decreased gradually when the gas outlet is coupled directly to a running vacuum pump. In that case, the pressure may decrease continuously from atmospheric pressure to a target sub-atmospheric pressure, such as 500 mbar below atmospheric pressure. A benefit of a slower decrease of the pressure is that vigorous boiling in the package may be prevented. A problem of vigorous boiling is that the valve may be contaminated and lose its function. Accordingly, in one embodiment of the second aspect, the rate of pressure reduction after the first period never exceeds 500 mbar/min. When the sub-atmospheric pressure has been provided in the oven, the temperature in the oven when the sub-atmospheric pressure is reached may for example be 40-130° C.

When the sealed package is subjected to the sub-atmospheric pressure, the valve opens and the food in the package is flash cooled, which means that the need for subsequent cooling is reduced or eliminated. Further, the flash cooling may prevent over cooking. When the package has been subjected to the sub-atmospheric pressure, the pressure inside the package is so low that the need for subsequent vacuum suction is reduced or eliminated. The "vacuum" inside the packages from the method of the second aspect helps preserving the cooked food.

During the method, the gas phase temperature in the sealed package should never exceed 80° C. This is achievable by controlling the temperature in the oven and the subsequent sub-atmospheric pressure.

When fish is cooked, a final temperature of the fish meat of about 55-70° C., such as 60-70° C., may be desired. If the temperature of the fish meat exceeds 70° C., it may be overcooked, while the fish meat may be under-cooked if it never reaches 55 or 60° C. For beef or lamb, a final temperature of the meat of about 60-70° C., may be desired. When poultry is cooked, a final temperature of the meat of about 72-82° C. may be desired. If the temperature of the poultry exceeds 82° C., it may be overcooked, while a temperature of at least 72° C. is often required to ensure that *listeria* and *salmonella* bacteria are killed. Similar temperatures are desired for pork. To obtain flash cooling at 82° C., a pressure of about 50 kPa (about 500 mbar below atmospheric pressure) is needed.

To obtain flash cooling at 70° C., a pressure of about 30 kPa (about 700 mbar below atmospheric pressure) is needed. To obtain flash cooling already at 60° C., a pressure of about 20 kPa (about 800 mbar below atmospheric pressure) is needed. Other types of food, such as lasagna, meatballs, stews, rise-based meals and vegetables can reach a higher temperature, such as 80-90° C., without being overcooked. Sometimes, such temperatures are even required to meet food safety regulations. Accordingly, a sub-atmospheric temperature of 250-600 mbar below atmospheric pressure, such as 250-500 mbar below atmospheric pressure, may be sufficient for such types of food.

Further, the method of cooking food may further comprise a third step 303 in which the sealed package is subject to cooling after it has been subjected to the sub-atmospheric pressure. During the cooling step, the ambient temperature of the sealed package may for example be 10° C. or lower, such as 8° C. or lower. The cooling step may be such that the temperature of the food in the package is 10° C. or lower, such as 8° C. or lower after the cooling step. This temperature may for example be reached within two hours of the expiry of the first time period.

As explained above, the food in the sealed package may thus be cooled in two way; first by flash-cooling caused by the sub-atmospheric pressure and then by the reduction of the ambient temperature during the cooling step.

The cooling step 303 and the foregoing sub-atmospheric step 302 may be carried out in the same device, in this case the oven 200. This means that the temperature in the cavity 104 may be decreased after the sub-atmospheric step. The cooling step may be carried out at atmospheric pressure. The pressure will therefore have to be raised in the cavity 104 of the oven 200 for this step. During this step, which may be the cooling step, the package will become a "vacuum pack".

The first step 301 may also comprise four sub-steps, 301a, 301b, 301c, and 301d. During the first sub-step 301a, the oven 200 is operated as described above for the first step 300. The first sub-step 301a preferably lasts for approximately 5 to 30 minutes such that the package and valve has been heated. During the second sub-step 301b, the pressure in the oven is lowered by the vacuum pump 109. The pressure is lowered for a time period of 30 seconds to 5 minutes, and until it has become somewhere in the range of 50 to 500 mbar. When the pressure is decreased, air and/or steam are let out of the package through the valve. As the thermally insulating air in the package is reduced, cooking and/or pasteurization of the food will be performed faster. Once a sufficiently low pressure has been reached, the pressure in the oven is once again increased in a third sub-step 301c, by allowing air to enter into the cavity until it reaches atmospheric or higher pressure. The time required for the third sub-step is in the range of 2 seconds to 15 minutes, depending on the desired pressure. The operation thereafter proceeds in the fourth sub-step 301d in which the food is cooked at atmospheric pressure or higher, the second step 302 in which the package is subjected to a sub-atmospheric pressure and, eventually, the third step 303 in which the package is cooled.

When the pressure in the oven is to be increased, as in the third sub-step 301c and the first step 301, this pressure increase may be achieved by the steam being introduced into the cavity.

The present invention has been described in relation to an exemplary embodiment. It is however conceivable to modify the method and the oven within the scope of the amended claims.

For example, it has been described that the heating element 106 provides heat for cooking food, and that a separate steam generator is provided. It is however conceivable that the steam generating arrangement may utilize the at least one heating element to generate the steam.

It has also been described that the vacuum source is a vacuum pump. It is however also conceivable with a vacuum tank or a vacuum tank connected to a vacuum pump. Such a vacuum tank may be an integral part of the oven or a separate tank. If no vacuum tank is used, the oven may comprise a vacuum pump connected to the gas outlet. When the oven of the first aspect comprises a vacuum tank, it may further comprise a vacuum pump connected to the vacuum tank.

It has also been described that the pressure increase may be achieved by the steam being introduced into the cavity. It may however also be achieved by a compressor providing pressurized air into the cavity.

The invention claimed is:

1. A method of cooking food provided in a sealed package, which is provided with a one-way valve that opens at an overpressure of 20-200 mbar, said method comprising:
   a first step in which the sealed package is heated in an oven for a first time period;
   wherein the pressure in the oven during at least a part of the first step is atmospheric pressure or higher, and
   after the first time period, a second step in which the package is subjected to a sub-atmospheric pressure such that gas leaves the sealed package through the valve,
   wherein the sub-atmospheric pressure in the second step is at least 100 mbar below atmospheric pressure.

2. The method according to claim 1, wherein the pressure in the oven during the entire first step is atmospheric pressure or higher.

3. The method according to claim 1, wherein the temperature in the oven is at least 70° C. during the first step.

4. The method according to claim 1, wherein the first time period is 20-180 min.

5. The method according to claim 1, wherein the sub-atmospheric pressure is provided in the oven by reducing the pressure therein.

6. The method according to claim 1, wherein the sub-atmospheric pressure in the second step is at least 200 mbar below atmospheric pressure.

7. A method of cooking food provided in a sealed package, which is provided with a one-way valve that opens at an overpressure of 20-200 mbar, said method comprising:
   a first step in which the sealed package is heated in an oven for a first time period;
   wherein the pressure in the oven during at least a part of the first step is atmospheric pressure or higher, and
   after the first time period, a second step in which the package is subjected to a sub-atmospheric pressure such that gas leaves the sealed package through the valve,
   wherein the first step comprises a first sub-step in which the pressure in the oven is atmospheric pressure or higher, a second sub-step in which the pressure in the oven is lowered to a pressure below atmospheric pressure, a third sub-step in which the pressure in the oven is increased to atmospheric pressure or higher, and a fourth sub-step in which the pressure is at atmospheric pressure or higher.

8. The method according to claim 7, wherein the first sub-step has duration of 5-30 minutes.

9. The method according to claim 7, wherein the pressure is lowered to 50-500 mbar during the second sub-step.

10. The method according to claim 7, wherein the second sub-step has duration of 0.5-5 minutes.

11. A method of cooking food provided in a sealed package, which is provided with a one-way valve that opens at an overpressure of 20-200 mbar, said method comprising:

a first step in which the sealed package is heated in an oven for a first time period;

wherein the pressure in the oven during at least a part of the first step is atmospheric pressure or higher, and after the first time period, a second step in which the package is subjected to a sub-atmospheric pressure such that gas leaves the sealed package through the valve, wherein the sealed package is subjected to cooling at an ambient temperature of 10° C. or lower after it has been subjected to the sub-atmospheric pressure of the second step.

12. The method according to claim 11, wherein the cooling is carried out at approximately atmospheric pressure.

13. A method of cooking food provided in a sealed package, which is provided with a one-way valve that opens at an overpressure of 20-200 mbar, said method comprising:

a first step in which the sealed package is heated in an oven for a first time period;

wherein the pressure in the oven during at least a part of the first step is atmospheric pressure or higher, and after the first time period, a second step in which the package is subjected to a sub-atmospheric pressure such that gas leaves the sealed package through the valve, wherein the sealed package is removed from the oven and then subjected to the sub-atmospheric pressure in a vacuum chamber that is separate from the oven.

14. The method according to claim 13, wherein the temperature in the vacuum chamber is decreased after the sealed package has been subjected to the sub-atmospheric pressure such that the temperature of the food in the sealed package is decreased.

* * * * *